April 24, 1951     J. W. COLTMAN ET AL     2,550,106

DETECTOR FOR ELEMENTARY PARTICLES

Filed June 6, 1947     2 Sheets-Sheet 1

WITNESSES:

INVENTORS
John W. Coltman and
Fitz-Hugh B. Marshall,
BY
ATTORNEY

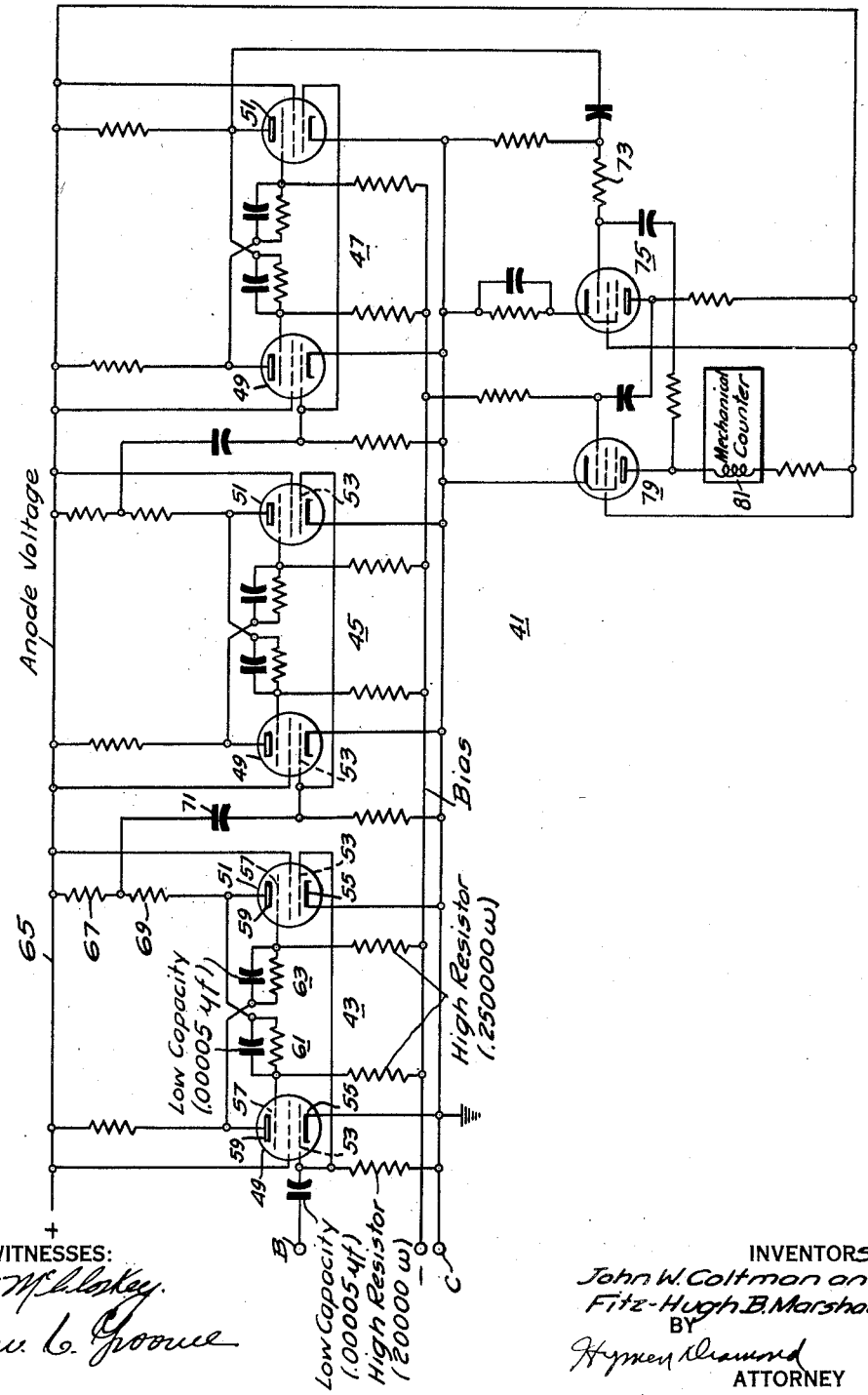

Patented Apr. 24, 1951

2,550,106

UNITED STATES PATENT OFFICE 2,550,106

DETECTOR FOR ELEMENTARY PARTICLES

John W. Coltman, Pittsburgh, and Fitz-Hugh B. Marshall, Glenshaw, Pa., assignors to Westinghouse Electric Corporation, East Pittsburgh, Pa., a corporation of Pennsylvania Application June 6, 1947, Serial No. 752,942

13 Claims. (Cl. 250—71)

Our invention relates to apparatus for detecting elementary particles and it has particular relation to apparatus for counting the incidence of such particles.

By the expression elementary particles, we mean atomic and nuclear particles of all types, masses as well as quanta. Within the scope of this expression are included protons, neutrons, electrons, mesons, cosmic rays, alpha rays, beta rays and gamma rays.

Apparatus constructed in accordance with the teachings of the prior art of which we are aware for detecting elementary particles is exemplified by the Geiger counter. The operation of this device depends on the ionization current which flows between a pair of electrodes in a gaseous atmosphere when the gas is ionized by elementary or secondary particles. The maximum rate of response of the Geiger counter to repeated incidence of particles in the gas is limited by the deionization time of the gas. A Geiger counter is therefore incapable of counting elementary particles which are incident at a high rate—a rate exceeding several hundred incidents per second.

It is accordingly an object of our invention to provide apparatus that shall be capable of counting the incidence of elementary particles incident at a high rate substantially greater than several hundred per second.

An ancillary object of our invention is to provide highly sensitive apparatus for use in counting the incidence of elementary particles.

A further ancillary object of our invention is to provide highly sensitive apparatus for detecting the presence of elementary particles.

Our invention arises from the realization that the dark current of a photo-multiplier is of substantial magnitude compared to the current which flows when the cathode of the multiplier is excited by the relatively weak radiation produced by individual elementary particles. The dark current of a photo-multiplier is the current which flows when the cathode of the multiplier is in its deenergized condition—that is, when substantially no light is impinging thereon. This current is of the order of $10^{-14}$ amperes and corresponds to the flow of approximately 100,000 electrons per second. If the light incident on the cathode of the photo-multiplier increases this current by only a few electrons, the incidence of the radiation will not be perceptible.

In accordance with our invention we provide a detecting system including an efficient arrangement for converting the energy of the elementary particles into radiation. The radiation converting means is, in the practice of our invention, a highly efficient fluorescent body. For this purpose, a fluorescent body of zinc sulphide, zinc cadmium sulphide, calcium tungstate and other similar substances may serve. The screen should be instantaneously responsive to the elementary particles impinging thereon and should have a low persistence time. Our invention also contemplates the provision of a highly efficient system for collecting the radiation from the fluorescent body and projecting it onto the cathode of the photo multiplier. For this purpose a cylindrical, spherical, parabolic or curved reflector of other contour is provided. In lieu of curved reflecting bodies, lenses, preferably high speed lenses, and combinations of reflecting surfaces and of lenses, may also be utilized. The fluoroscent body and the cathode of the photo-multiplier are disposed at conjugate foci of the reflector. The expression "of the spherical type," when used in this specification, shall mean a curved surface reflector or lens of any contour.

The novel features that we consider characteristic of our invention are set forth with particularity in the appended claims. The invention itself, however, both as to its organization and its method of operation, together with additional objects and advantages thereof, will best be understood from the following description of a specific embodiment when read in connection with the accompanying drawings, in which:

Fig. 3 is a circuit diagram showing details of a scaling device used in the practice of our invention, and indicated by a block diagram in Fig. 1.

Figure 1:
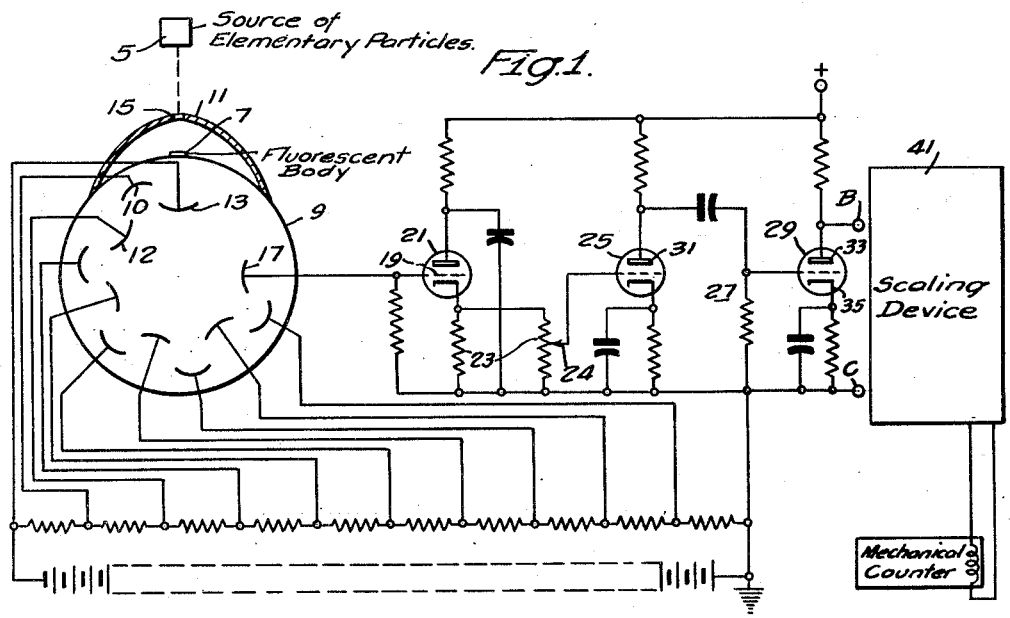
Figure 1 is a circuit diagram of an embodiment of our invention.

The apparatus shown in Fig. 1 comprises a source 5 of elementary particles illustrated symbolically as a block. Particles emitted from the source are projected onto a highly efficient short-time persistence fluorescent body 7. The body 7 is disposed adjacent a photo-multiplier 9, preferably the RCA type 1P21 or 931A. A reflector 11 of the spherical type is so disposed with respect to the fluorescent body and the cathode 13 of the photo-multiplier 9 that the fluorescent body 7 and the cathode 13 are at conjugate foci of the reflector. In the practice of our invention, the fluorescent body 7 and the reflector 11 may be mounted on the envelope of the photo-multiplier 9. The reflector in such an arrangement covers the cathode of the photo-multiplier and the fluorescent body and is provided with a small opening 15 through which the elementary particles pass to the fluorescent body. For particles of certain types, for example, high speed B-rays, the opening 15 need not be provided, particularly if the reflector 11 is composed of thin aluminum.

The most positive electrode 17 of the photo-multiplier 9 is connected to the control electrode 19 of a high vacuum tube 21 connected in a cathode follower circuit. The output impedance 23 of the cathode follower is relatively low and may be matched to the characteristic impedance of a coaxial cable if the remainder of the equipment is operated at a substantial instance from the photo-multiplier 9.

The output of the cathode follower is impressed in the input circuit of an amplifier 25. The output of the latter is impressed in the input circuit 27 of a second amplifier 29. The cathode follower 21 and the amplifiers 25 and 29 should be designed as a video amplifier having a band pass sufficiently broad to revolve the pulses at the desired counting rate.

When an elementary particle impinges on the fluorescent body 7, a scintillation is produced. The light from the scintillation impinging on the cathode 13 of the photo-multiplier ejects photo-electrons which are swept to the first dynode 10 of the photo-multiplier 9, and cause the ejection of several secondary electrons, which are in turn caused to impinge on the second dynode 12, and the process is repeated at all the dynodes so that a very large number (of the order of 1,000,000 times the original) of electrons arrive at the anode 17, causing it to become highly negative. A negative pulse is then impressed from the output of the cathode follower 21 in the control circuit of the first amplifier 25. The potential of the anode 31 of the first amplifier increases and a positive impulse is impressed in the control circuit 27 of the second amplifier 29. The potential of the anode 33 of the second amplifier 29 then decreases substantially and a negative impulse is between this anode 33 and the cathode 35.

Figure 2:
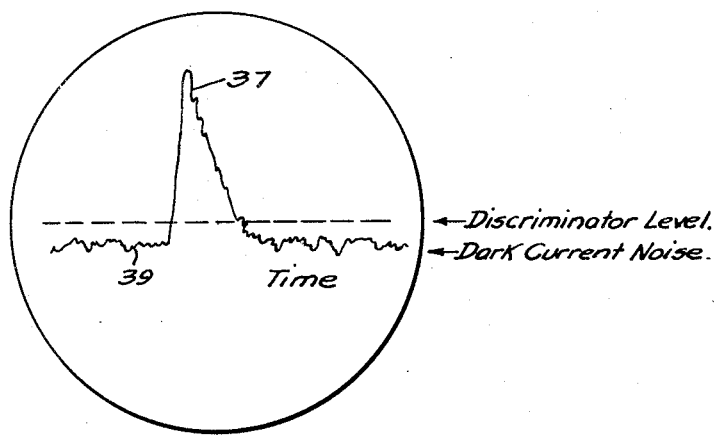
Fig. 2 is a reproduction of an oscilloscope display produced in the practice of our invention.

To observe the character of the signal at the output of the second amplifier 29, a cathode ray oscilloscope (not shown) may be connected across this output (B, C). The actual display produced on the scope when a single elementary particle impinges on the fluorescent screen is illustrated in Fig. 2. This display comprises a peak 37 rising out of an irregular background 39. The peak indicates the current above dark current (in the photo-multiplier 9) produced by an elementary particle which has struck the fluorescent body 7. The duration of the peak is of the order of one millionth of a second, and depends on the phosphorescent characteristics of the body 7. From measurements of the area of the peak produced when a single alpha particle having energy of the order of five million electron volts impinges on the fluorescent body 7 composed of zinc sulphide, we have determined that approximately 10,000 photo-electrons are released from the cathode 13 by the radiation from the resulting scintillation. The pulses produced under such circumstances we found to be approximately 50 times the height of the background or dark current pulses. Thus the arrival of a single high energy particle can be distinguished from the myriad of dark current electrons emitted from the cathode.

To count the scintillations, the output of the second amplifier 29 is impressed in the input circuit of a suitable scaling device 41. The scaling device 41 is an electronic circuit which transmits one pulse for a predetermined number of output pulses from the amplifier 29. The number is determined by the structure of the scaling device. Such scaling devices require a pulse of a certain amplitude to operate them; by adjustment of the gain control tap 24 the output of the amplifiers 25 and 29 can be controlled so that only the larger pulses due to scintillations from the body 7 are recorded, the dark current pulses being too small to operate the scaling circuit. The broken line in Fig. 2 labeled Discriminator Level represents one setting of the tap 24. Pulses having amplitudes falling below this level will fail to operate the scaling device 41; pulses having amplitudes above this level will operate it.

A suitable scaling device is shown in Fig. 3. This device comprises a plurality of flip-flop networks 43, 45 and 47. Each flip-flop network includes a pair of tubes 49 and 51 (for example, 6J7 tubes). The output of the amplifier 29 is connected between the control electrodes 53 and the cathodes 55 of both tubes of the first network 43. The suppressor grid 57 of the first tube 49 is connected through a network 61, including a capacitor and a resistor, to the anode 59 of the second tube 51. The suppressor grid 57 of the second tube 51 is connected through a similar network 63 to the anode 59 of the first tube. The anode of the second tube 51 is connected to the anode potential line 65 through two resistors 67 and 69. The control grids of the tubes 49 and 51 of the second flip-flop network 45 are coupled to junction of the resistors 67 and 69 through a capacitor 71. The control grids of the tubes 49 and 51 of the third flip-flop network 47 are similarly coupled to the second tube 51 of the second network. Additional networks may be similarly coupled to preceding networks. The output circuit of the last flip-flop network (in the present situation the third) is connected to the input 73 of a biased multi-vibrator circuit comprised of tubes 75 and 79, whose purpose is to supply the mechanical counter 81 with a strong pulse of current of constant amplitude and duration when excited by the output pulse from 51.

Normally, one of the tubes 49 or 51 of each flip-flop network is conductive while the other 51 or 49 is non-conductive. The parameters of a network is such that a negative pulse of sufficient amplitude impressed between the control grid 53 and the cathode of a conductive tube renders the tube non-conductive; a positive pulse impressed in the control grid does not affect the conductivity either of a conductive or a non-conductive tube; and a positive pulse impressed on the suppressor grid of a non-conductive tube from the anode of another tube of a network does render the tube conductive.

Let us assume that the first tube 49 of the first flip-flop network 43 is conductive while the second tube is non-conductive. When an elementary particle impinges on the fluorescent body and the latter scintillates, a negative pulse is impressed in the input circuits of the tubes 49 and 51 of the first network 43. The first tube 49, therefore, becomes non-conductive. The positive potential of the anode 59 of the first tube rises substantially and a positive potential is impressed between the suppressor grid 57 and the cathode 55 of the second tube 51 of the network 43. The second tube 51, therefore, becomes conductive and the potential of its anode 59 drops. The potential impressed between the suppressor grid 57 and the cathode 55 of the first tube 49 now becomes negative and the first tube remains non-conductive.

When the second tube 51 of the first flip-flop network 43 becomes non-conductive, a negative pulse is impressed in the grid circuits of the tubes 49 and 51 of the second flip-flop network 45 and they change their conductivities in the same manner as the tubes of the first flip-flop network 43. The third flip-flop network 47 and subsequent networks (which may be included in the system at will) operate similarly. The negative pulse derived at the output of the last flip-flop network (47 in the situation illustrated) is impressed on the control circuit 73 of the multivibrator circuit, 75—79, and a current pulse is conducted through the counting mechanism 81. The counting mechanism registers one count.

When a second elementary particle impinges on the fluorescent body 7, another negative pulse is impressed on the control grids 53 of the tubes of the first flip-flop network 43. The first tube 49 of this network (43) is unaffected, but the second tube 51 becomes non-conductive. By the operation of the suppressor grid 57 of the first tube 49 the latter is now rendered conductive. When the second tube 51 of the network 43 becomes non-conductive, the control grids 53 of the tubes in the second flip-flop network 45 are supplied with a pulse of positive potential. However, this pulse is not effective to render the first tube 49 of the latter network 45 conductive and does not change the conductivity of the second tube 51. The operation of succeeding networks continues unchanged and the counter mechanism 81 does not (attempt to) register a count for the second pulse. The third pulse affects the first flip-flop network 43 in the same manner as the first pulse. From the output of the second tube 51 of the first network 43, a negative pulse is now impressed between the control grid 53 and the cathode 55 of the second tube 51 of the second flip-flop network 45. The latter is rendered non-conductive and the first tube 49 of the second network 45 is rendered conductive. The anode of the second tube 51 of the second network 45 now is rendered substantially positive in potential and a positive pulse is impressed on the control grids of the tubes of the third flip-flop network 47. The tubes of this network are unaffected by the positive pulse. The fourth pulse like the second pulse affects the first flip-flop network 43, but the second and third flip-flop networks 45 and 47 continue to operate unchanged. The fifth pulse affects the first flip-flop network 43; the first network affects the second flip-flop network 45. Since the second tube 51 of the second flip-flop network 43 now becomes conductive, the third flip-flop network 47 is also affected. However, the second tube of this network 47 is rendered non-conductive and the counting mechanism is not affected by the positive pulse impressed on the control circuit of the amplifier 75. For the sixth pulse, like the other even pulses, the first network is affected but the others are not. For the seventh pulse, the first and second networks 43 and 45 only are affected. For the eighth pulse only the first network 43 is affected. For the ninth pulse, the three networks are affected, the second tube 51 of the third network 47 becomes conductive and the counting mechanism registers as it registered for the first pulse.

In the scaling device shown in Fig. 2, accordingly, the counting mechanism 81 registers one count for every eight scintillations. The number of scintillations per register can be increased to any desired magnitude by increasing the number of flip-flop networks between the second amplifier 29 and the mechanical counter. The video amplifiers (21, 25, 29) and the networks (43, 45, 47) are designed to transmit a pulse with tolerable sharpness at one micro-second intervals. Therefore, the scaling circuit shown in Figs. 1 and 3 is capable of counting one million scintillations per second, and with a sufficient number of stages may be used to operate a mechanical counter at 100 counts/second. This rate compares with the several hundred per second of which a Geiger counter is capable. While the scaling networks shown in the drawing are used in the preferred practice of our invention, our invention is not limited to such scaling mechanisms. For example, a scaling mechanism in which a capacitor controlling an amplifier (or thyratron) is charged to a potential such as to charge the conductivity of the amplifier for each predetermined number of pulses impressed thereon, may be used. Where such a capacitor is used, it should be charged through a biased diode (or similar discriminating circuit) which prevents dark current pulses from contributing to the charge. Within the broader aspects of our invention is also a system in which the response to scintillations is one for one.

Although we have shown and described a certain specific embodiment of our invention, we are fully aware that many modifications thereof are possible. Our invention, therefore, is not to be restricted except insofar as is necessitated by the prior art and by the spirit of the appended claims.

We claim as our invention:

1. For use in counting the incidence of elementary particles the combination comprising, a photo-multiplier, a body which emits radiation to which said multiplier is sensitive when said particles impinge thereon, means for projecting onto said multiplier substantially all radiation from said body which practicably can be projected, and counting means responsive to the output of said multiplier to be actuated on each incidence of a predetermined number of pulses of radiant energy on said multiplier.

2. For use in counting the incidence of elementary particles the combination comprising, a fluorescent body, a photo-multiplier, means for projecting onto said multiplier substantially all the radiation from said body which practicably can be projected, counting means responsive to the output of said multiplier to be actuated on each of a predetermined number of incidences of light from said body on said multiplier, and current discriminating means capable of preventing pulse current under a certain predetermined value from entering said counting means.

3. For use in counting the incidence of elementary particles, the combination comprising, a fluorescent body, a photo-multiplier, a reflector disposed to collect the radiation from said body and project it on said multiplier, counting means responsive to the output of said multiplier to be actuated on each of a predetermined number of incidences of light from said body on said multiplier, and current discriminating means capable of preventing pulse current under a certain predetermined value from entering said counting means.

4. In combination a fluorescent body, a reflector of the spherical type, said body being disposed at the focus of said reflector, a photo-multiplier disposed so that the radiation from the reflector impinges thereon and means responsive to the output of said multiplier above a certain current level.

5. For use in counting the incidence of elementary particles the combination comprising, a fluorescent body which scintillates on the incidence of said particles, a reflector of the spherical type, said body being disposed at the focus of said reflector, a photo-multiplier disposed so that the radiation from the reflector impinges thereon, and counting means responsive to the output of said multiplier, current discriminating means capable of preventing current under a certain predetermined value from entering said counting means.

6. In combination, a fluorescent body, a photo-multiplier responsive to the radiation from said body actuable on each scintillation of said body, and a network responsive to impulses produced by the multiplier at the rate of at least one million per second and capable of operating in such a manner as to produce a response for each predetermined number of responses of said multiplier, and current discriminating means capable of preventing current under a certain predetermined value from entering said counting means.

7. In combination, a fluorescent body, a photo-multiplier responsive to the radiation from said body and actuable on each scintillation of said body, means capable of concentrating said radiation on said photo-multiplier, a video amplifier responsive to the output of said multiplier, means responsive to the output of said video amplifier and actuable for each predetermined number of actuations of said multiplier, and current discriminating means capable of preventing pulse current under a certain predetermined value from entering said counting means.

8. A radiation detector comprising, a screen on which incident radiation will produce scintillations, a photoelectric surface, focusing means capable of collecting photons produced by said scintillations and causing them to impinge on said photoelectric surface, means responsive to the action of said photons on said photoelectric surface to amplify the pulse produced thereby, and discriminating means capable of preventing the passage of pulse currents below a certain predetermined value.

9. A radiation detector as described in claim 8 including a counting means responsive to the output of said discriminating means.

10. A scintillation detector comprising, a screen on which incident radiation will produce scintillations, a photo-electric surface responsive to said scintillation to produce a pulsation for each incident scintillation, said surface having pulsation responses other than that produced by said scintillations, a discriminator circuit responsive to the output of said surface adapted to transmit only pulsating signals exceeding a predetermined level such that pulsation responses produced by said scintillations are transmitted and said other pulsation responses are suppressed and means actuable by the output of said discriminator.

11. A scintillation detector comprising, a screen on which incident radiation will produce scintillations, a photo-electric surface, apparatus for collecting radiation emitted by said screen and focusing it on said photo-electric surface in such manner that said photo-electric surface will be responsive to said scintillation to produce a vibration for each incident scintillation, said surface having pulsation responses other than that produced by said scintillations, a discriminator circuit responsive to the output of said surface adapted to transmit only pulsating signals exceeding a predetermined level such that pulsation responses produced by said scintillations are transmitted and said other pulsation responses are suppressed and means actuable by the output of said discriminator.

12. A scintillation detector comprising, a screen on which incident radiation will produce scintillations, a photo-electric surface responsive to said scintillation to produce a pulsation for each incident scintillation, said surface having pulsation responses other than that produced by said scintillations and means actuable by the predetermined pulsations of the output of said surface.

13. The method of detecting a weak scintilation with apparatus including a photo-multiplier having a predetermined dark current which comprises the steps of gathering light from said scintillation and projecting said gathered light on said multiplier, sufficient being gathered to eject during the time interval during which said scintillation occurs a number of the photoelectrons from the cathode of said multiplier substantially greater than the number of dark current electrons ejected during said interval.

JOHN W. COLTMAN.
FITZ-HUGH B. MARSHALL.

REFERENCES CITED

The following references are of record in the file of this patent:

UNITED STATES PATENTS

| Number | Name | Date |
|---|---|---|
| 1,897,219 | Schroter | Feb. 14, 1933 |
| 1,935,698 | Decker et al. | Nov. 21, 1933 |
| 2,225,044 | George | Dec. 17, 1940 |
| 2,305,452 | Kallmann et al. | Dec. 15, 1942 |
| 2,351,028 | Fearon | June 13, 1944 |
| 2,401,288 | Morgan et al. | May 28, 1946 |
| 2,407,564 | Martin et al. | Sept. 10, 1946 |
| 2,408,230 | Shoupp | Sept. 24, 1946 |

OTHER REFERENCES

U. S. AEC Document MDDC 275 by J. S. Allen, pp. 1–11, Mar. 1, 1944.

Electron and Nuclear Counters by S. A. Korff, D. Van Nostrand Co., New York, published Apr. 1946.

X-Ray Inspection with Phosphors and Photoelectric Tubes, H. M. Smith, General Elec. Review, Mar. 1945, pp. 13–17.

"Medical physics," Otto Glasser, published by Year Book Publishers of Chicago, 1944.